Patented Mar. 10, 1925.

1,529,259

UNITED STATES PATENT OFFICE.

FRED M. LOCKE AND FRED J. LOCKE, OF VICTOR, NEW YORK.

GLASS.

No Drawing.   Application filed December 9, 1922.   Serial No. 605,998.

*To all whom it may concern:*

Be it known that we, FRED M. LOCKE and FRED J. LOCKE, citizens of the United States, and residents of Victor, in the county of Ontario and State of New York, have invented certain new and useful Improvements in Glasses, of which the following is a specification.

The present invention relates to glasses and to batches from which they are made and an object of the invention is to provide a glass which will act as a high voltage insulator at high temperatures. Another object of the invention is to provide a glass made from a large amount of calcium fluoride and having the quality of transparency and having also substantially no alkali content. A further object of the invention is to provide a glass with substantially no alkali content and a high alumina content. Still another object of the invention is to provide a glass having a low silica content, a high alumina content, substantially no alkali content, low expansion and high electrical insulation under heat. Another and still further object of the invention is to provide a transparent fluoride glass with substantially no alkali content. A still further object of the invention is to provide a glass with substantially no alkali content and having the charactertistics of low expansion and high electrical insulation under heat. Other and further objects of the invention will be hereinafter pointed out and will be set forth in the appended claims.

The glasses forming the subject matter of this invention may be considered from two different viewpoints: First, a glass adapted for electrical insulators, including spark plugs, and capable of withstanding an electrical current at high temperatures; and, second, a glass adapted for optical purposes and having the properties of transparency while being made from a batch which has a high calcium fluoride content.

From the first viewpoint, we have found in glasses that electrical insulation under heat is directly proportional to the alkali content of the glass, that is, the higher the alkali content, the poorer the electrical insulation under heat, and that this insulation decreases as the heat is increased. For instance, an insulator one inch thick made of glass containing about 4.5% of alkali (considered a low content) will withstand an electrical current exceeding 180,000 volts at a temperature at about 70° F. but, when this same insulator is heated to 800° F., its dielectric strength is reduced to zero and it becomes a conductor.

From a second viewpoint, we have discovered that fluoride compounds, such as calcium fluoride (fluorspar) may be used in very large amount, say up to 35% of a batch to produce a transparent glass which will not affect the melting pot as other fluoride glasses usually do, this being believed to be due to the fact that a larger amount of alumina is used in the batch.

The following tables are a number of raw batches made in accordance with this invention:

|  | 1 | 2 | 3 | 4 | 5 | 6 | 7 | 8 |
|---|---|---|---|---|---|---|---|---|
| Silica | 30 | 37 | 40 | 34.5 | 35 | 25 | 43 | 50 |
| Alumina, hydrated | 20 | 25 | 18 | 16 | 15 | 35 | 25 | 30 |
| Boric acid | 40 | 25 | 17 | 14 | 28 | 15 | 20 |  |
| Fluorspar | 10 | 10 | 8.5 | 7 | 7 | 25 | 12 | 20 |
| Magnesium carbonate |  | 3 |  |  |  |  |  |  |
| Lead oxid |  |  | 16.5 | 28.5 | 15 |  |  |  |

In the following table the glasses *a* to *h*, inclusive, are glasses calculated from the batches 1 to 8, inclusive, of the foregoing table, whereas the glass *i* is additional glass made in accordance with this invention:

|  | a | b | c | d | e | f | g | h | i |
|---|---|---|---|---|---|---|---|---|---|
| $SiO_2$ | 42 | 50 | 50 | 42 | 44 | 34 | 55 | 57 | 68 |
| $Al_2O_3$ | 20 | 20.5 | 13 | 13 | 12.6 | 32.5 | 22.5 | 23 | 15.5 |
| $B_2O_3$ | 30 | 19 | 12 | 9 | 19.4 | 13.5 | 14 |  | 10.3 |
| CaO | 8 | 8 | 6 | 5 | 5 | 20 |  | 8.5 | 20 | 5.7 |
| MgO |  | 2.5 |  |  |  |  |  |  | .25 |
| $Na_2O$ |  |  |  |  |  |  |  |  | .25 |
| PbO |  |  | 19 | 31 | 19 |  |  |  |  |

All of the above glasses have a low silica content, that is a content not exceeding 70%, and we are aware that this content may be reduced as low as 25% and still obtain some of the results of this invention.

It will be noted that all the batches as well as the glasses contain large amounts of alumina. In the examples given, the finished glasses contain from 12.6% to 32.5% of alumina, but it will be understood that the invention is not confined to these limits, as it has been found that some of the results of this invention may be secured by providing an alumina content of 10% to 35% in the finished glass. Alumina has not heretofore been used in low-expansion glasses in large amounts because when combined with an alkali, it will produce large expansion or make the glass so hard that it is impracticable to work. In this invention the alumina appears to act as a flux and increases the workability of the glass, stopping danger of the crystalization, increasing stability, and tending to make low expansion.

In the batches set forth, it will be noted that the calcium fluoride is the principal flux as it is found that the best results are secured by its use. However, other fluorides or other compounds of the alkaline earth metals may be employed particularly if it is not desirable to obtain transparent glass. Heretofore calcium fluoride (fluorspar) has been used in large amounts in glasses and glazes for the purpose of producing opalescence in the glasses or glazes, and, when so used, has had the effect of eating away the pots or vessels used in melting the batch. In this invention, large amounts of fluospar (from 5% to 25% of the batch) are used and clear glasses are produced without affecting the melting pot, this being believed to be due to the large amount of alumina which neutralizes the effect of the fluorspar (calcium fluoride) on the melting pot and takes away the property of producing opalescence. This appears to be shown from the fact that, in the above glasses, the lowering of the alumina content will make the glasses opalescent and will increase the action on the melting pot, and increase the expansion of the glass when calcium fluoride is used, the finished glass will show from analysis calcium oxide and the presence of fluorine. In some of the batches forming part of this invention, the boric oxid has been partially replaced by lead for the increasing of fusibility and workability of the batch, while, at the same time, decreasing the liability to crystallization and has a tendency to better its insulation. Instead of lead, barium may be used, in some cases.

The linear co-efficient of expansion of most of the glasses is less than .0000050.

A further advantage of glasses made in accordance with this invention is high stability against the attack of steam, water, acids, and atmospheric conditions and fair stability against alkalies, this latter being unusual as glasses heretofore made with substantially no alkali content are readily attacked by alkali solutions, especially under the action of heat. Glasses made in accordance with this invention may be melted or worked in the ordinary pot or tank and may be soft and plastic through a considerable range of temperature allowing them to be pressed or blown into shape in the ordinary manner. Furthermore, a transparent optical glass may be obtained from a batch high in fluorine.

This invention provides a glass which is free from alkali or has such a small alkali content as not to interfere with electrical resistance under heat. In addition, a glass is provided which is clear and transparent, has low expansion, good stability and electrical resistance under heat up to the softening point of the glass, this softening point being variable according to the composition of the glass from 500° centigrade to 900° centigrade. These characteristics are particularly desirable in the spark plug insulator which is exposed to high heat, large temperature changes and hard mechanical stresses, so that a glass of a low co-efficient of expansion, good mechanical strength, and a high softening point, as well as a high electrical insulation under heat is required. Heretofore glasses have been made which have had one or more of the desirable properties hereinbefore mentioned, but so far as we are aware no glass has been produced which has the following characteristics: low expansion, good stability to mechanical attacks or the attacks of the atmosphere or other elements, capable of being melted and worked in the ordinary furnaces used in glass making without crystallization in the pots or hardness to workability, high insulation under heat, and a high softening point. Some of the glasses set forth are opal in color, while others are clear transparent glasses and it is to be understood that the invention is not limited as to its color.

In the specification and claims, the glass is described as having high electrical insulation under heat and by this is to be understood a glass which will have an effective temperature ($te$) resistivity of at least 500° centigrade, as measured by the Bureau of Standards in "Aeronautic Power" plants report 18, Washington, D. C., January 6th, 1919.

It will be understood that this invention is not limited to the compositions or percentages hereinbefore set forth as we are aware that many changes may be made in the compositions and the percentages and other elements added, but we have further found that within the hereinbefore mentioned limits the best glasses seem to be produced.

The new glass herein described is particularly adapted for use as insulators for spark plugs. Its transparency enables the user to ascertain at once the condition of all of the spark plugs and note if all are firing properly as the flash of each explosion can be distinctly seen through the spark plug if the spark plug is working properly. It may also be ascertained through the spark plug if the gasoline mixture is of correct proportion for if the mixture is too rich the flash is of a yellow color, whereas when the mixture is right the flash is of a light blue color.

By the use of the term, glass, in the specification and claims is intended to mean a substance containing silica in combination with various acids and bases and adapted to be pressed or blown into articles of any desired form.

By the use of the term, low-expansion, used in the claims, it is intended to cover a glass having a linear co-efficient of expansion of less than .0000050 or less between 30° and 250° centigrade.

What we claim as our invention and desire to secure by Letters Patent is:

1. A glass having a low silica content, a high alumina content, the qualities of transparency and high electrical insulation under heat, and containing an alkaline earth oxid.

2. A glass having a high alumina content, a low co-efficient of expansion, substantially no alkali content, containing an alkaline earth oxid and having the quality of transparency.

3. A glass containing calcium oxid, having a low silica content, a high alumina content, substantially no alkali content, and having the qualities of transparency and of high electrical insulation under heat.

4. A glass containing boric oxid, having a low silica content, a high alumina content, substantially no alkali content, and the quality of transparency.

5. A glass containing calcium oxid and boric oxid and having a low silica content, a high alumina content and substantially no alkali content.

6. A glass having a low silica content, a high alumina content, substantially no alkali content, and showing by analysis the presence of fluorine.

7. A glass low in silica, high in alumina, having the quality of transparency and showing by analysis the presence of fluorine.

8. A glass containing between 25% and 55% of silica, boric oxid, calcium oxid, and at least 10% of alumina, and having the qualities of transparency and high electrical insulation under heat.

9. A glass containing silica, boric oxid, at least 10% of alumina and calcium oxid, being substantially free from alkali and having a co-efficient of expansion not greater than .0000050.

10. A glass containing at least 20% of alumina, at least 25% of silica, boric oxid, calcium oxid and being transparent and substantially free from alkali.

11. A glass containing between 25% and 50% of silica, an alkaline earth oxid, boric oxid, at least 10% of alumina and calcium oxid, being substantially free from alkali and having a co-efficient of expansion not greater than .0000050, and the quality of high electrical insulation under heat.

12. A glass containing at least 20% alumina, at least 25% of silica, an alkaline earth oxid and having the qualities of transparency and high electrical insulation under heat.

13. A glass containing silica, boric oxid, a high content of alumina, an alkaline earth oxid, lead oxid being substantially free from alkali and having the qualities of low expansion and high stability.

14. A glass containing silica, boric oxid, lead oxid, an alkaline earth oxid, and alumina, having a low co-efficient of expansion and the qualities of transparency and high electrical insulation under heat.

15. A glass containing 40% to 55% of silica, not less than 15% of alumina, not less than 10% of boric oxid, calcium oxid and being substantially free from alkali.

16. A glass containing at least 40% of silica, at least 15% of alumina and calcium oxid and being substantially free from alkali and having the quality of transparency.

17. A glass containing no alkali, having a large content of alumina showing by analysis the presence of fluorine and having the quality of transparency.

18. A glass containing between 25% and 57% of silica, at least 20% of alumina, between 9% and 27% of boric oxid, between 5% and 20% of calcium oxid, and having the qualities of transparency and high electrical insulation under heat.

19. A glass containing 25% to 57% of silica, boric oxid 9% to 27%, alumina 12% to 23% and alkaline earth metal oxid, said glass having the quality of transparency and high electrical insulation under heat.

20. A glass batch containing silica, alumina, and calcium fluoride, and capable of forming a clear transparent glass having a linear co-efficient of expansion of less than .0000050, and the quality of high electrical insulation under heat.

21. A glass batch containing silica, at least 15% of alumina, calcium fluoride, boric acid, and capable of making a transparent glass having the quality of high electrical insulation under heat.

22. A glass batch containing silica, alumina, calcium fluoride, boric acid, and lead oxid, and capable of making a transparent glass having the quality of high electrical insulation under heat and having a co-efficient of expansion of less than .0000050.

FRED M. LOCKE.
FRED J. LOCKE.